US006455855B1

United States Patent
Kwasnick et al.

(10) Patent No.: US 6,455,855 B1
(45) Date of Patent: Sep. 24, 2002

(54) SEALED DETECTOR FOR A MEDICAL IMAGING DEVICE AND A METHOD OF MANUFACTURING THE SAME

(75) Inventors: Robert Forrest Kwasnick, Palo Alto; Christopher O. Paragas, Foster City; Ruben-Horacio Flores Moctezuma, Gilroy, all of CA (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 0 days.

(21) Appl. No.: 09/552,846

(22) Filed: Apr. 20, 2000

(51) Int. Cl.[7] .................................................. H01L 31/18
(52) U.S. Cl. ...................... 250/361 R; 438/64; 438/69
(58) Field of Search ........................ 250/361 R, 370.11, 250/363.02; 438/64, 69; 156/87

(56) References Cited

U.S. PATENT DOCUMENTS 5,132,539 A * 7/1992 Kwasnick et al. ...... 250/361 R
6,172,371 B1 * 1/2001 DeJule et al. .......... 250/370.11

FOREIGN PATENT DOCUMENTS

| EP | 0 529 981 A2 | 3/1993 |
| FR | 2 758 630 A1 | 7/1998 |
| FR | 2 758 654 A1 | 7/1998 |

* cited by examiner

*Primary Examiner*—Constantine Hannaher
(74) *Attorney, Agent, or Firm*—McAndrews, Held & Malloy, Ltd.; Peter J. Vogel; Michael A. Dellapenna

(57) ABSTRACT

An apparatus and method are provided for sealing a light imaging array and scintillator of an imaging device which prevents light or moisture from entering the sealed cavity while controlling the lateral expansion of the epoxy material during construction. The seal is formed by dispensing a bead of epoxy around substantially the entire perimeter of the active imaging array and scintillator, leaving a slight gap therein. A cover plate is then placed over the scintillator and imaging array to protect against light or moisture entering the sealed cavity from the side of the substrate that is sealed. As the cover plate is attached, it compresses the epoxy. During compression, pressure builds within the sealed cavity. However, the pressure is allowed to escape through the gap in the epoxy bead. The pressure release lowers the outward force against the epoxy bead, which in turn limits the lateral expansion of the epoxy. The gap is then filled with epoxy by using a syringe that is inserted into the gap and withdrawn as the epoxy is dispensed, thereby enclosing the sealed cavity.

18 Claims, 4 Drawing Sheets

SEALED DETECTOR FOR A MEDICAL IMAGING DEVICE AND A METHOD OF MANUFACTURING THE SAME

CROSS REFERENCE TO RELATED APPLICATIONS (if applicable)

Not applicable.

STATEMENT REGARDING FEDERALLY SPONSORED RESEARCH & DEVELOPMENT (if applicable)

Not applicable.

BACKGROUND OF THE INVENTION

The preferred embodiments of the present invention generally relate to a x-ray detector for a x-ray imaging system and a method of manufacturing the detector.

X-ray imaging systems are used, for example, for medical application in diagnosing and treating patients. A x-ray system comprises a x-ray source, the rays from which are partially absorbed by the object being imaged, e.g., a patient, and a x-ray detector. The x-ray detector comprises a x-ray imager which absorbs x-rays and creates an electrical signal related to the number of x-rays absorbed across an area. External circuitry controls the x-ray imager and reads out the imager's signals and mechanical housing. The x-ray system may also comprise computers to control the system and store data and mechanical gantries and tables to position the various elements.

The x-ray imager further includes a light imaging array formed on a substrate, a scintillator, and a cover plate. The x-rays enter the x-ray imager through the cover plate and are absorbed by the scintillator. The scintillator then converts the x-rays into light and emits the light onto a light imaging array which contains numerous light sensitive elements or pixels. The pixels comprise photosensitive elements, such as photodiodes, the signal from which is read out via contact fingers outside the light imaging array to contact pads located near the perimeter of the substrate. External circuitry is connected to the contact pads which in turn process the signals into a readable image.

Since the light imaging array is sensitive to light, it must be shielded from all ambient light. Also, the scintillator's performance is effected by the absorption of moisture (hygroscopic), and must be protected from ambient moisture. Therefore, the x-ray imager contains a moisture-resistant, opaque cover plate which lies over, but does not come into contact with, the scintillator or the imager substrate. The cover plate is affixed to the substrate using a sealant such as epoxy. The epoxy seal extends around the entire perimeter of the cover plate, thus completely enclosing the light imaging array and scintillator. Conventional detectors have experienced certain drawbacks in manufacturing and operation as the cover plate is placed over the imaging array and scintillator (hereafter referred to as the sealed cavity). The cover plate compresses the epoxy, causing the epoxy to flatten and spread laterally, which enhances the contact between the epoxy and both the substrate and the cover plate. Furthermore, once the seal is initiated between the substrate, the cover plate and the epoxy, the compression of the epoxy increases the pressure within the enclosed sealed cavity, often causing non-uniform, outward lateral expansion of the epoxy. Oftentimes, the expansion causes the seal to fail because 1) the seal becomes too narrow in local regions to effectively protect against light or moisture from entering the sealed cavity and/or 2) the epoxy expands outward to the contact pads, thereby greatly reducing the ability to make contact with external circuitry.

The preferred embodiments of the present invention address these needs and other concerns.

BRIEF SUMMARY OF THE INVENTION

A preferred embodiment of the present invention includes an apparatus and method for sealing an imaging detector. One preferred embodiment of the present invention seals a x-ray detector that includes a light imaging array, a substrate, a scintillator, and a cover plate. The cover plate, scintillator, and substrate define a cavity. A bead of epoxy or other sealant is placed around the sealed cavity, preferably on the substrate. However, the epoxy does not extend completely around the entire region; rather, a small pressure opening or gap remains. It is preferred that the pressure opening is located near one corner of the sealed cavity. When the cover plate begins to compress the epoxy, any build-up of pressure within the sealed cavity escapes through the pressure opening. Thus, the use of a pressure opening leads to a reduction in the outward pressure on the epoxy, which in turn reduces the outward lateral expansion of the epoxy. After the cover plate is attached, the pressure opening is filled with epoxy through the use of a soft-tipped syringe, thereby enclosing the sealed cavity.

Alternatively, a preferred embodiment of the present invention may include multiple pressure openings that may be located at any point around the perimeter of the sealed cavity. Although it is preferred that the same substance is used as the sealant and the gap sealant, an alternative embodiment may utilize different substances for each. Another alternative embodiment may fill the pressure opening by using a metal-tipped syringe if the tip is properly angled to allow insertion of the tip into the pressure opening without making contact with either the scintillator or light imaging array.

These and other features of the present invention are discussed in the following detailed description of the preferred embodiments of the present invention. It shall be understood that other features and advantages will become apparent to those skilled in the art upon review of the following detailed description, drawings, and claims.

DETAILED DESCRIPTION OF THE INVENTION

Figure 1:
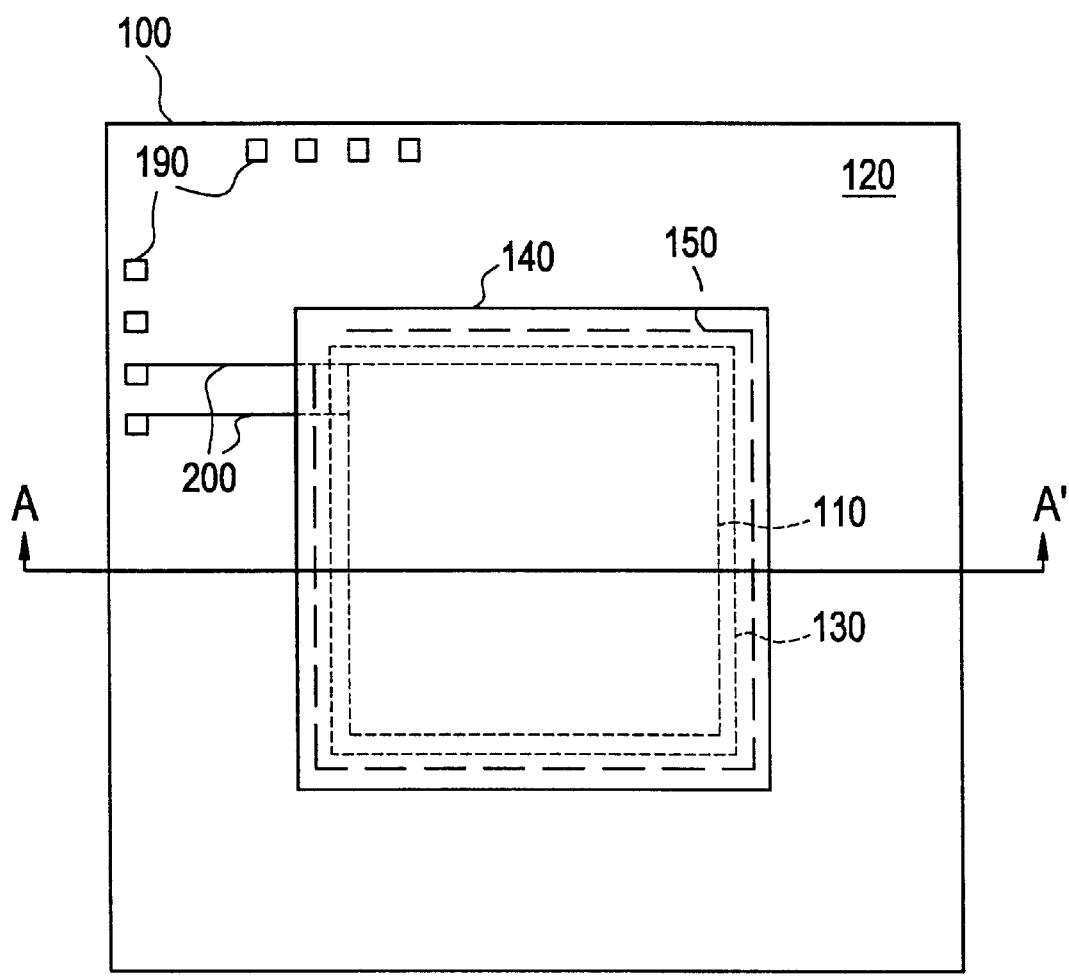
FIG. 1 is a plan view of a x-ray imager in which the active imaging array and scintillator are sealed in accordance with the preferred method of the present invention.
Figure 2:
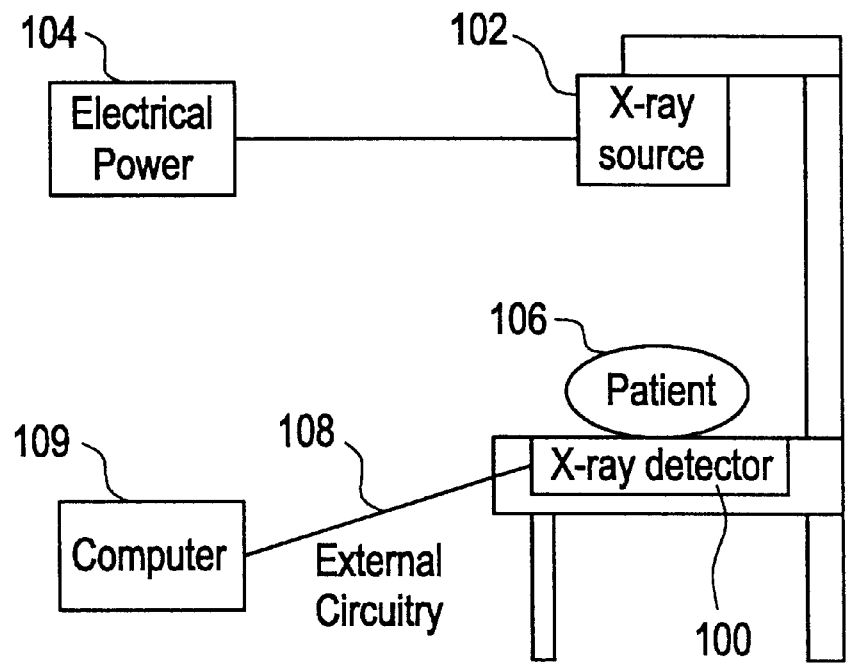
FIG. 2 illustrates the components of a x-ray imaging device.

FIG. 1 illustrates a x-ray imaging detector 100. In accordance with a preferred embodiment of the present invention, a preferred embodiment of the present invention is implemented in connection with a solid state x-ray imaging device. Solid state x-ray imagers are well known in the art, and thus, the specific structure will not be discussed in detail herein. As illustrated in FIG. 2, a x-ray imager includes a x-ray source 102 that is connected to a source of electrical power 104. The x-rays emitted by the x-ray source 102 travel through the item be imaged (usually a patient) 106. The x-rays are absorbed by the x-ray imaging detector 100, which converts the x-rays into an electrical signal. The electrical signal passes through the external circuitry 108 to a computer 109 that converts the electrical signal into a readable image. Alternatively, the preferred embodiment may be implemented in connection with other x-ray detectors having two sealed plates that define a cavity.

Figure 3:
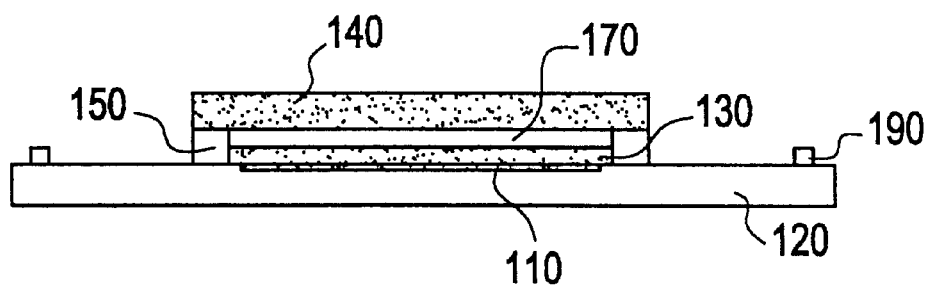
FIG. 3 is a cross section view of FIG. 1 taken along the line A–A'.

As illustrated in FIG. 3, a solid state x-ray imager 100 includes a light imaging array 110, a substrate 120, a scintillator 130 and a cover plate 140. The cover plate 140 is attached to the substrate 120 by using a continuous bead of sealant 150 that substantially surrounds the scintillator 130. The scintillator 130, the cover plate 140 and the sealant 150 define a sealed cavity 170.

In the examples of FIGS. 1 and 3, the light imaging array 110 is configured in a square shape. Optionally, the light imaging array 110 may be configured in any desired pattern, such as oval, circular, rectangular and the like. The scintillator 130 converts incoming x-rays to light in a desired range of wavelengths. The scintillator 130 emits the light onto the light imaging array 110.

The light imaging array 110 may contain numerous photosensitive pixels (not shown), typically 0.05 to 0.4 millimeters on a side. The pixels may be comprised of amorphous silicon based photodiodes and switching thin film transistors. The photodiodes may be electrically connected in parallel by a common electrode. The charge on the photodiodes is read out through the transistors via scan and data address lines. The common electrode and address lines are connected to contact pads 190 via contact fingers 200 on the substrate. The contact pads, which are located near the perimeter of the substrate 120, are in turn connected to the external circuitry. Numerous contact pads 190 are closely spaced along the four sides of the substrate 120. The density of the contact pads 190 may be reduced near the four corners of the substrate 120.

Figure 4:
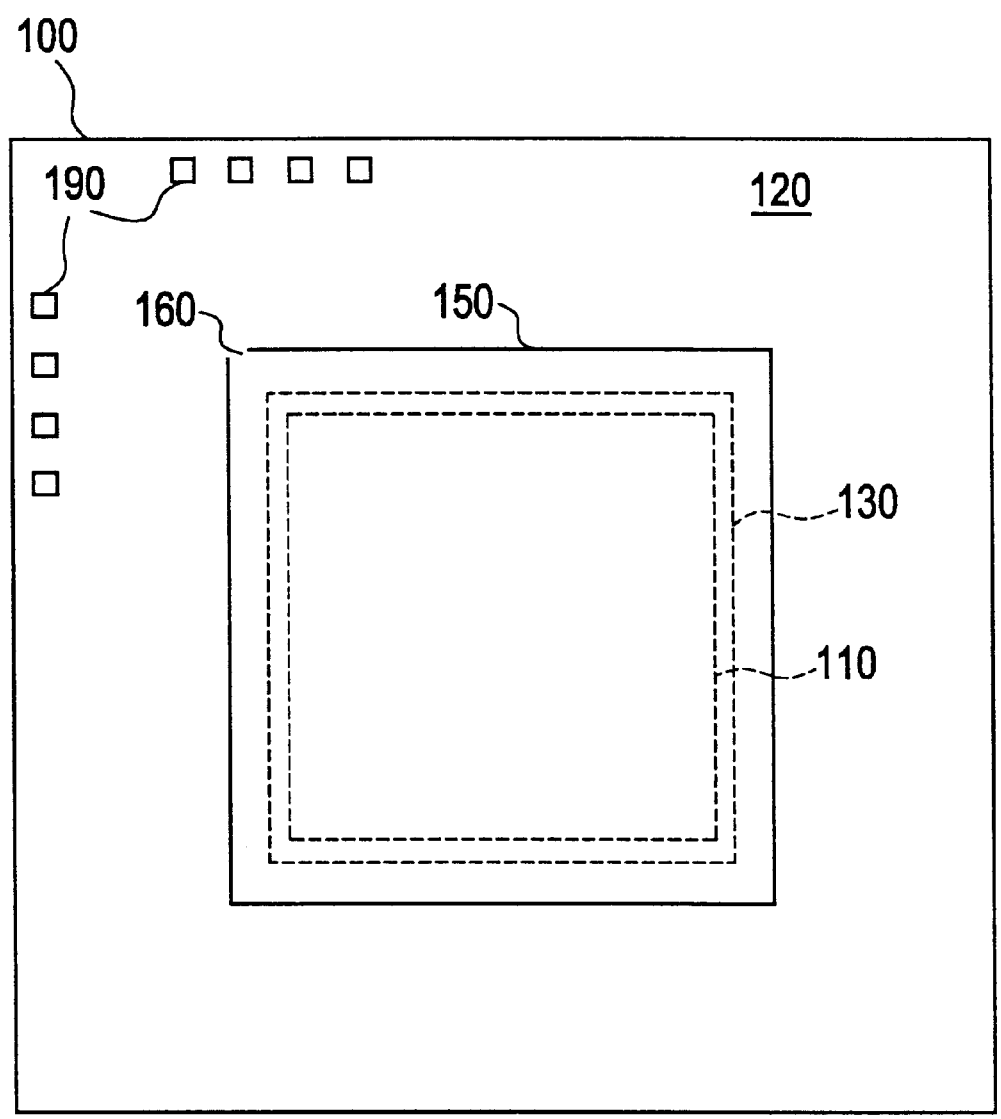
FIG. 4 is a plan view of the x-ray imager in FIG. 1 without the cover plate in accordance with the preferred method of the present invention.
Figure 5:
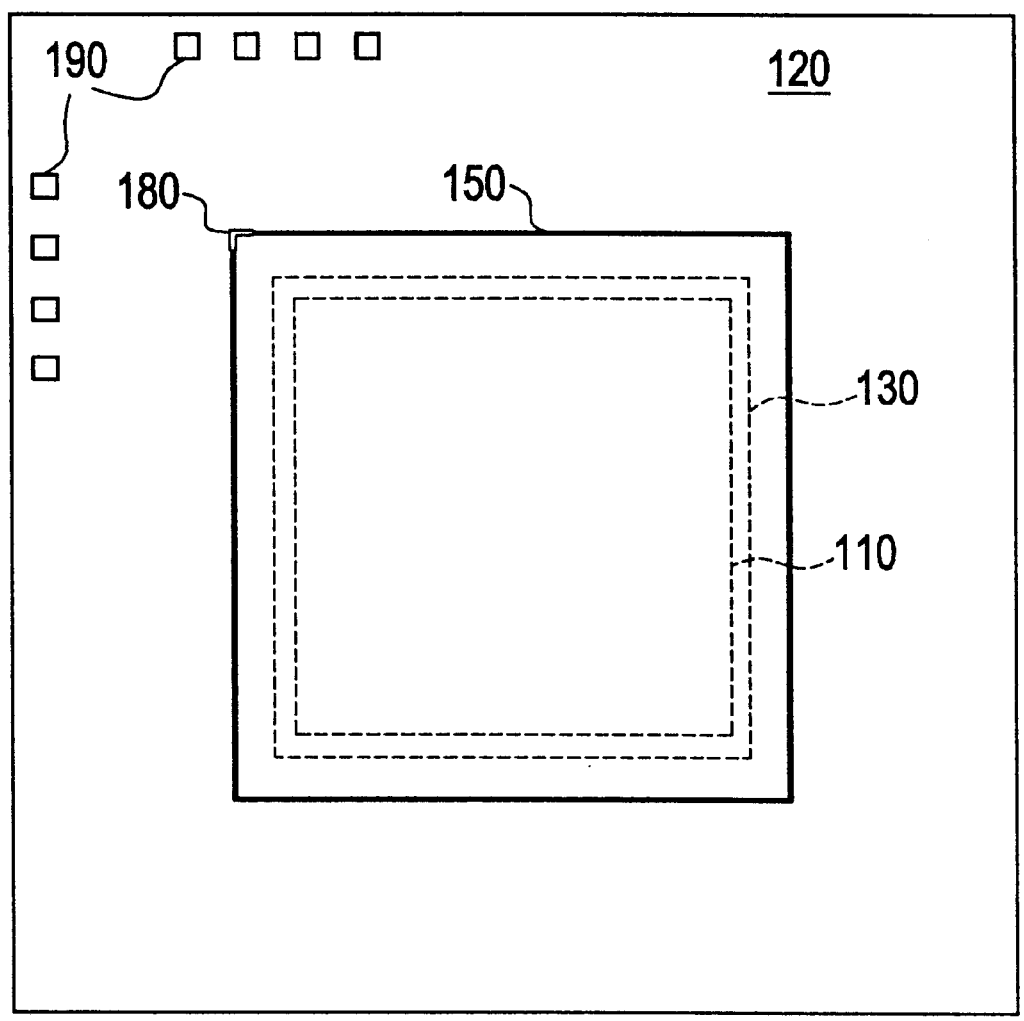
FIG. 5 is the plan view of FIG. 4 in which the gap has been sealed with gap sealant in accordance with the preferred method of the present invention.

The process of constructing the imaging detector 100 includes forming the light imaging array 110, contact pads 190 and the contact fingers 200 on the substrate 120. Next, the scintillator 130 is either disposed on or secured to the light imaging array 110. The bead of sealant 150 is then dispensed on the substrate 120, preferably around the scintillator 130. When the sealant 150 is applied a pressure opening 160 (FIG. 4) is retained. The pressure opening 160 may be only a few millimeters in width and may be located at any point around the perimeter of the scintillator 130. Preferably, the pressure opening 160 is 1–5 millimeters in width. Multiple pressure openings 160 may be arranged around the scintillator 130, but preferably in a corner of the substrate 120. During construction the cover plate 140 is pushed down upon the substrate 120 which causes pressure to build within sealed cavity 170. This pressure escapes through the pressure opening 160, thereby limiting the outward pressure upon the sealant 150. As seen in FIG. 5, after the cover plate 140 is securely fastened to the substrate 120, the pressure opening 160 is filled with gap sealant 180, thereby completely enclosing the sealed cavity 170.

Outside light may alter the output of the imaging detector 100. Thus it is preferable that the sealed cavity 170 be free of ambient light entering the sealed cavity 170 from the side of the substrate 120 which is sealed. Also, any substance that touches or interferes with the contact pads may prevent the light imaging array 110 from making contact with the external circuitry. Thus, it is preferable that the sealant 150 not overlay the contact pads 190.

The scintillator 130, for example CsI doped with Tll, absorbs x-rays from the light imaging array 110 and emits associated light wavelengths. The scintillator 130 may be directly deposited onto the substrate by thermal evaporation through a shadow mask or may be a distinct body of material placed adjacent to the light imaging array 110. To get the maximum output from each pixel of the light imaging array 110, the scintillator 130 covers all or substantially all of the light imaging array 110. The scintillator 130 should not be so large as to interfere with the contact pads 190.

Much like the imaging array 110, the scintillator 130 should be protected. Since the scintillator may be hygroscopic, moisture that enters the sealed cavity 170 may decrease the scintillator's efficiency. In order to protect both the imaging array 110 and the scintillator 130, a cover plate 140 is placed over top of, but not in contact with, the scintillator 130. The cover plate 140 also cannot come in contact with the contact pads 190. The cover plate 140 is usually an opaque, moisture-resistant, substantially x-ray transmissive cover, such as a graphite composite cover with aluminum laminated on the surfaces.

The cover plate 140 is attached to the substrate 120 using a sealant 150. The preferred sealant is an opaque and relatively moisture-resistant epoxy, such as Armstrong Type A661. A continuous bead of sealant 150 is placed on either the substrate 120 or the cover plate 140. For example, the sealant 150 may be dispensed by a syringe controlled by a motorized computer X-Y stage. As seen by comparing FIGS. 1 and 3, the sealant 150 should be placed to contact the outer perimeter of the cover plate 140. Since the cover plate is attached to the substrate after the light imaging array 110 and scintillator 130 are in place, it is preferred that the sealant 150 is placed on the substrate 120 since the light imaging array 110 and scintillator 130 allow alignment of the sealant 150 during application. As shown in FIG. 4, the continuous bead of sealant 150 should contain a small pressure opening 160. Although the preferred embodiment of the present invention has only one pressure opening 160, an alternate embodiment could contain multiple gaps.

Once the cover plate 140 is attached to the substrate 120, pressure is applied to either object until the distance between the cover plate 140 and the substrate 120 attains a predetermined thickness, such as 7 mils. It is preferred that the cover plate 140 not touch the scintillator 130 since contact may degrade the scintillator's performance. Mechanical shims or spacers may be used to define the precise distance between the cover plate 140 and the substrate 120. As pressure is applied to the cover plate 140, the sealant 150 is compressed, thereby causing lateral expansion of the sealant.

Once in place, the scintillator 130, the cover plate 140, and the sealant 150 define a sealed cavity 170 of predetermined volume and thickness. Furthermore, this applied pressure could cause a build up of pressure within the sealed cavity 170, especially when the cover plate 140 is greater than 20 centimeters by 20 centimeters in area. However, the sealed cavity 170 is open to the atmosphere via pressure opening 160, and thus, any pressure build-up within the sealed cavity 170 will escape through the pressure opening 160. The pressure opening 160 equalizes the pressure between the sealed cavity 170 and the surrounding atmosphere, thereby limiting the outward pressure on the sealant 150 from within the sealed cavity 170.

Since the sealed cavity exerts minimal pressure, if any, against the sealant 150, the lateral expansion of the sealant 150 will mainly result from the compression of the sealant 150. Since the vertical expansion of the sealant 150 should be substantially proportional to the lateral expansion, the lateral expansion can be predetermined if the dimensions of the continuous bead of sealant 150 and the final distance between the substrate 120 and cover plate 140 are known. For example, if the sealant 150 is 21 mils thick before compression and a mechanical spacer locates the cover plate 140 seven mils above the substrate 120, the vertical compression factor will be approximately three. Thus, the sealant 150 will also expand laterally by about a factor of three. In this manner, the sealant 150 can be accurately located so that compression of the sealant 150 will not cause the sealant 150 to expand so much that the sealant 150 comes in contact with the contact pads 190.

Once the cover plate is in an acceptable position, the sealant 150 is allowed to at least partially cure. Accordingly the preferred embodiment of the present invention, the process curing may take place in either dry or nitrogen ($N_2$) ambient conditions in order to protect the scintillator 130 from ambient moisture. Using the preferred epoxy, the sealant 150 should be allowed to cure for four to 24 hours. Once at least partially cured, any mechanical shims used to define the precise distance between the cover plate and the substrate are removed and a gap sealant 180 is used to fill the pressure opening 160. Although a composition of the gap sealant can be different than that of the sealant 150, the preferred embodiment utilizes the same epoxy for both the sealant 150 and the gap sealant 180. The gap sealant 180 is applied using a syringe (not shown) which is inserted into the pressure opening 160, and slowly withdrawn as the gap sealant 180 is dispensed. Since both the light imaging array 110 and the scintillator 130 can be easily damaged, it is preferred that the syringe tip is made from a soft, flexible material, such as Teflon®. Alternatively, a hard tip could be used if angled correctly so that the epoxy can be dispensed without damaging the light imaging array 110 or the scintillator 130. Once inserted, the gap sealant 180 is allowed to cure until both the sealant 150 and gap sealant 180 are complete, thereby enclosing the entire sealed cavity 170.

It is apparent from the previous description that the preferred embodiment of the present invention provides a novel system that satisfies the objectives and advantages set forth above. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A method of manufacturing an imaging detector, comprising:
    forming a light imaging array on a substrate;
    dispensing a bead of sealant around a perimeter of the light imaging array, leaving at least one pressure release opening in the bead of sealant;
    attaching a cover plate to the bead of sealant to form a cavity between the bead of sealant, the cover plate and the substrate;
    pushing the cover plate down upon the substrate until the cover plate and the substrate are spaced a predetermined distance from one another, wherein pressure built within the cavity during the pushing step escapes through the at least one pressure release opening; and
    after completing the pushing step, filling the pressure release opening with a gap sealant.

2. The method of manufacturing of claim 1, further comprising limiting outward pressure upon the bead of sealant by permitting pressure to escape through the at least one pressure release opening during the pushing step.

3. The method of manufacturing of claim 1 wherein the dispensing step includes leaving multiple pressure release openings in the bead of sealant.

4. The method of manufacturing of claim 1 wherein the sealant is epoxy.

5. The method of manufacturing of claim 1 wherein the gap sealant is epoxy.

6. The method of manufacturing of claim 1 wherein the sealant and the gap sealant are the same substance.

7. The method of manufacturing of claim 1 wherein the at least one pressure release opening is located adjacent to a corner of the substrate.

8. The method of manufacturing of claim 1 wherein the at least one pressure release opening is filled using a syringe.

9. The method of manufacturing of claim 8 wherein the tip of the syringe is plastic.

10. A method of attaching a cover plate to the substrate of an imaging detector, comprising:
    dispensing a bead of sealant on a substrate of the imaging detector, leaving at least one pressure release opening in the bead of sealant;
    attaching a cover plate to the bead of sealant to form a cavity between the bead of sealant, the cover plate and the substrate;
    applying pressure to at least one of the cover plate and the substrate to compress the bead of sealant until the cover plate and the substrate are spaced a predetermined distance from one another, wherein pressure built up within the cavity during the applying step escapes through the at least one pressure release opening; and
    after completing the applying step, filling the at least one pressure release opening with a gap sealant.

11. The method of manufacturing of claim 10, further comprising limiting outward pressure upon the bead of sealant by permitting pressure to escape through the at least one pressure release opening during the applying step.

12. The method of manufacturing of claim 10 wherein the dispensing step includes leaving multiple pressure release openings in the bead of sealant.

13. The method of manufacturing of claim 10 wherein the sealant is epoxy.

14. The method of manufacturing of claim 10 wherein the gap sealant is epoxy.

15. The method of manufacturing of claim 10 wherein the sealant and the gap sealant are the same substance.

16. The method of manufacturing of claim 10 wherein the at least one pressure release opening is located adjacent to a corner of the substrate.

17. The method of manufacturing of claim 10 wherein the at least one pressure release opening is filled using a syringe.

18. The method of manufacturing of claim 17 wherein the tip of the syringe is plastic.

* * * * *